United States Patent
Yang et al.

(10) Patent No.: US 11,302,072 B2
(45) Date of Patent: Apr. 12, 2022

(54) SYSTEM FOR CONSTRUCTING URBAN DESIGN DIGITAL SAND TABLE

(71) Applicant: SOUTHEAST UNIVERSITY, Jiangsu (CN)

(72) Inventors: Junyan Yang, Jiangsu (CN); Beixiang Shi, Jiangsu (CN); Jun Cao, Jiangsu (CN); Tanhua Jin, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 257 days.

(21) Appl. No.: 16/629,312

(22) PCT Filed: Jun. 6, 2018

(86) PCT No.: PCT/CN2018/090057
§ 371 (c)(1),
(2) Date: Jan. 7, 2020

(87) PCT Pub. No.: WO2019/196186
PCT Pub. Date: Oct. 17, 2019

(65) Prior Publication Data
US 2020/0134915 A1   Apr. 30, 2020

(30) Foreign Application Priority Data

Apr. 12, 2018 (CN) .......................... 201810330224.7
May 23, 2018 (CN) .......................... 201810500656.8

(51) Int. Cl.
*G06G 7/48* (2006.01)
*G06T 17/10* (2006.01)
(Continued)

(52) U.S. Cl.
CPC .............. *G06T 17/10* (2013.01); *G06F 30/13* (2020.01); *G06T 19/003* (2013.01); *G06F 2111/20* (2020.01)

(58) Field of Classification Search
CPC ....... G06T 17/10; G06T 19/003; G06T 17/05; G06F 2111/20; G06F 30/13
See application file for complete search history.

(56) References Cited

U.S. PATENT DOCUMENTS 7,062,532 B1 *  6/2006  Sweat ................... G06Q 10/06
                                                                 709/205
2012/0290492 A1   11/2012  Zabala Rodriguez
2017/0147162 A1 *  5/2017  Host ................... G06F 3/04883

FOREIGN PATENT DOCUMENTS

CN    104077447    10/2014
CN    107679229     2/2018

OTHER PUBLICATIONS

Wenlong, Z. H. U., Jia Lu, and Tao Ru. "The application of urban simulation in urban planning." 2010 3rd International Conference on Computer Science and Information Technology.*

(Continued)

*Primary Examiner* — Rehana Perveen
*Assistant Examiner* — Nithya J. Moll
(74) *Attorney, Agent, or Firm* — JCIPRNET (57) ABSTRACT

A system for constructing an urban design digital sand table, the system includes the following modules. A sand table environment constructing module, configured to construct a digital environment of the urban design sand table. An element grading display module, configured to perform hierarchical management on urban design elements, and perform visual hierarchical display. A spatial indicator interpretation module, configured to articulate names, algorithms, and attributes for indicators in an indicator library of the urban design digital sand table. A spatial calculation tool module, configured to load a toolkit to calculate a selected range in the digital sand table. An offline data extraction module, configured to extract the data of the digital sand table so as to export two-dimensional or three-dimensional (Continued)

spatial data in an offline mode. A dynamic real-time editing module, configured to perform real-time editing operation on an urban digital design scheme loaded in the system.

7 Claims, 5 Drawing Sheets

(51) Int. Cl.
    *G06T 19/00*     (2011.01)
    *G06F 30/13*     (2020.01)
    *G06F 111/20*     (2020.01)

(56) References Cited

OTHER PUBLICATIONS

Wang, Yunpeng, et al. "Application research on method for data format transformation on road informationization of Jilin city based on SuperMap." 2009 First International Conference on Information Science and Engineering. IEEE, 2009.*

Yi, Y. G., H. P. Liu, and X. P. Liu. "Deepen the GIS spatial analysis theory studying through the gradual process of practice." The International Archives of Photogrammetry, Remote Sensing and Spatial Information Sciences 40.6 (2014): 119.*

Semmo, Amir, et al. "Interactive visualization of generalized virtual 3D city models using level-of-abstraction transitions." Computer Graphics Forum. vol. 31. No. 3pt1. Oxford, UK: Blackwell Publishing Ltd, 2012.*

Stavric, Milena, and Ognen Marina. "Parametric modeling for advanced architecture." International journal of applied mathematics and informatics 5.1 (2011): 9-16.*

"SuperMap 3D GIS with BIM". Jul. 12, 2016.*

"International Search Report (Form PCT/ISA/210) of PCT/CN2018/090057", dated Jan. 11, 2019, with English translation thereof, pp. 1-4.

Yang Junyan, et al., "From Static Blueprints to Dynamic Intelligence: The Theory of Digital Management Platform for Urban Design," Urban Planning Forum, Mar. 2018, pp. 65-74.

* cited by examiner

SYSTEM FOR CONSTRUCTING URBAN DESIGN DIGITAL SAND TABLE

CROSS-REFERENCE TO RELATED APPLICATION

This application is a 371 of international application of PCT application serial no. PCT/CN2018/090057, filed on Jun. 6, 2018, which claims the priority benefit of China application no. 201810330224.7, filed on Apr. 12, 2018 and China application no. 201810500656.8, filed on May 23, 2018. The entirety of each of the above mentioned patent applications is hereby incorporated by reference herein and made a part of this specification.

TECHNICAL FIELD

The present invention belongs to the technical field of urban planning, and particularly relates to a system for constructing an urban design digital sand table.

BACKGROUND ART

A digital sand table technology is an electronic sand table technology based on RS and GIS technologies, which integrates image data, vector spatial data and subsequent calculation and display functions. Currently, a digital sand table is mainly applied to a relatively macroscopic geographical scale, and has the following four advantages: rapid and convenient generation of digital terrain, detailed and intuitive display of the digital terrain, retrieval and analysis, and an integrated 3S system. With support of computers, geographic information systems, virtual reality, visualization technologies and multimedia technologies, function applications of the digital sand table have been involved in military affairs, line planning, real estate, water conservancy projects, fire protection, regional planning, geographical research, and the like. Currently, a basic process of a general digital sand table system is as follows: (1) preparation and processing of terrain data; (2) preparation and processing of remote sensing image data; (3) geographical operations such as geometric correction, fusion and clipping; (4) superposition of socioeconomic data, thematic data, and the like; (5) MAPGIS system platform integration of spatial database, attribute database, image database, and the like; (6) three-dimensional visualization, browsing, query, statistical analysis, and printout.

On this basis, generally, functions of the digital sand table may be summarized into three categories: basic functions of the sand table system, data maintenance functions and statistical analysis functions. 1. The basic functions of the sand table system mainly include: collection and editing of multi-source data, basic operations of maps, map layer operations, basic transformation of projections, editing of thematic maps, attribute query and data printout and visualization. 2. The data maintenance functions mainly include: update and maintenance of network data, image data, graphic data and attribute data. 3. The statistical analysis functions mainly include: link visibility and a visible range, earthwork calculation, flood analysis, network analysis, image analysis and other practical analysis functions.

The existing digital sand table technology is more directed to processing of existing terrain and economic data, but does not solve the problems of digitization, loading and the like of urban design, and the problem of superposition of multi-source big data and urban spatial form data, as well as underlying functional demands for urban design scheme interaction, urban design project management, coupling analysis of the multi-source big data and spatial forms, and the like. These issues and functional demands are key demands in the field of the urban design, and the difference between an urban design digital sand table and geospatial digitization.

SUMMARY OF THE INVENTION

Object of the invention: In view of the above technical problems existing in the prior art, the present invention provides a system for constructing an urban design digital sand table. The system can construct a digital environment of an urban design sand table, divide the functions of the digital sand table according to actual demands of urban design, may easily import urban design schemes into the overall urban environment, and use the digital sand table as a platform to perform digital research, analysis, management and control of the urban design.

Technical scheme: In order to achieve the above object of the present invention, technical schemes adopted by the present invention are as follows: a system for constructing an urban design digital sand table, including the following modules:

a sand table environment constructing module, configured to construct a digital environment of the urban design sand table;

an element grading display module, configured to perform hierarchical management on urban design elements, and perform hierarchical display by constructing a visual precision grading system;

a spatial indicator interpretation module, configured to articulate names, algorithms, and attributes for indicators in an indicator library of the urban design digital sand table;

a spatial calculation tool module, configured to load a toolkit to calculate a selected range in the urban digital sand table;

an offline data extraction module, configured to export two-dimensional and three-dimensional data in the selected space range in an offline mode; and a dynamic real-time editing module, configured to perform real-time editing operation on an urban digital design scheme loaded in the system.

The sand table environment constructing module implements construction of the digital environment of the urban design sand table by performing the following steps:

(1.1) acquiring three-dimensional slice cache model data in an urban range, and digitizing the model data to generate a monomer model that may participate in calculation; specifically, acquiring the three-dimensional slice cache model data in the urban range based on an oblique photography technology, wherein auxiliary lens devices include Ultra-Cam, Leica RCD30 and SWDC-5; recording corresponding configuration in an SCP format through an RCD30 platform, and storing the corresponding configuration in an UltraLAB GX480P/GX610P Turing computation workstation; further, generating a DSM (Digital Surface Model) by SuperMap software; and then, based on vector surface data corresponding to oblique photography data, judging an effective range of model TIN (Triangulation Irregular Net), and fitting a model surface from top to bottom to generate the monomer model that may participate in the calculation;

(1.2) converting and unifying a coordinate system of multi-source big data into an urban coordinate system, and storing the multi-source big data in an SHP format to realize digital superposition of the multi-source big data, wherein the multi-source big data include business POI (Points of interest), mobile phone signaling, and LBS (Location Based Service) positioning, and the coordinate system of multi-source big data is unified into the urban coordinate system, usually the Yellow Sea coordinate system;

(1.3) formatting and revising an urban three-dimensional model design file into a data source in a UDB format supported by the system to realize digital conversion of the urban design scheme; specifically, by Autodesk FBX software, converting the acquired urban design three-dimensional model file in an SKP format into a MAX format file, revising the file in 3DS Max software, and further converting the file into the data source in the UDB format supported by the system;

(1.4) extracting control elements of the urban design scheme by points, lines and planes to realize extraction of the control elements of the urban design scheme; and (1.5) storing, sharing and releasing multi-dimensional data for the environmental model constructed for the urban design digital sand table and a multi-source big data file; according to an urban built environment model and the source SCP file of the multi-source big data, saving the associated SCP data to a MongoDB database and generating a new SCP configuration file; storing three-dimensional model data and control element data of the urban design scheme in a database type data source, wherein the database type data source includes Oracle Plus, Oracle Spatial, SQL Server Plus, PostgreSQL, and DB2, and geometric information and attribute information are stored in the database; a front end adopts a C/S platform architecture sand table and module system, and a deployment form is an EXE executable file; the MongoDB database is deployed in a background to share and release current data such as oblique photography, and a GIS (Geographic Information System) data server and the like are deployed in the background; and the front end loads the background data through a database port and GIS data service URL.

The element grading display module has the following functions:

(2.1) hierarchically storing urban design element data, performing hierarchical display on the design elements in a form of layer trees, and dynamically managing display or hiding of the hierarchical design elements based on demand interaction;

(2.2) according to different display demands, constructing a visual precision grading system, and displaying element content of corresponding precision under different scales; and (2.3) according to the visual precision grading system, performing hierarchical display on the levels of details displayed by the elements; specifically, by an LOD (Levels of Details) technology, according to the visual precision grading system, performing hierarchical display on the levels of the details displayed by the elements; displaying the near elements by fine model effects, and displaying the distant elements by a simple model to improve rendering performance of the elements.

The spatial indicator interpretation module has the following functions:

(3.1) summarizing professional indicator terms in all urban designs to form the indicator library of the urban design digital sand table;

(3.2) compiling an indicator meaning table as an index file of the indicator library on the basis of the indicator library of the urban design digital sand table; and (3.3) entering the indicator meaning table into the system, so that each indicator noun is articulated with a plurality of attribute links including indicator interpretation and calculation formulas.

The spatial calculation tool module has the following functions:

(4.1) selecting a plurality of elements to form a set or a certain spatial range by clicking or framing the elements;

(4.2) based on the selected element set or spatial range, according to the spatial indicator interpretation module, automatically acquiring element model information data in the spatial range, and calculating basic spatial indicators; and (4.3) according to urban design spatial calculation demands, dividing the spatial calculation tool module into three spatial calculation toolkits: a spatial basic calculation toolkit, a single-dimensional data calculation toolkit, and a multi-source data coupling calculation toolkit, and by the above toolkits, respectively performing geometrical analysis of a spatial form, distribution structural analysis of a single-dimensional data type, and superposition coupling degree analysis of any two types of data in multi-source data, for the selected set or range.

The offline data extraction module has the following functions:

(5.1) delineating a spatial range requiring offline data extraction on a system map by drawing, wherein delineating the spatial range on the system map by drawing refers to that a plurality of coordinate points are formed by clicking on the system map by a mouse sequentially, and the plurality of coordinate points are sequentially connected to form a closed area, that is, the spatial range of offline data extraction; and (5.2) based on polygon clipping, packing and exporting the two-dimensional and three-dimensional data in the selected spatial range.

The dynamic real-time editing module has the following functions:

for the urban design scheme loaded in the system, by mouse dragging interactive operations or interface modification of parameters, based on memory simulation, stretching or scaling a dimension of a model in real time, dynamically reconstructing the model, and based on a texture mapping technology, adjusting model rendering colors or texture maps in real time.

Beneficial effects: Compared with the prior art, the technical schemes of the present invention have the following beneficial effects:

(1) the urban design digital sand table system provided by the present invention is directed to a current digital trend of urban design development, and based on actual functional demands and on the basis of the urban environment, the multi-source big data and digitalization of the urban design schemes, the digital sand table system composed of different functional modules is constructed, thus being capable of conveniently loading urban design results into the urban environment and carrying out corresponding digital interaction, analysis, research, management and control; and (2) the present invention fills the blank in this technical field, and constructs the scientific, standardized and convenient urban design digital sand table system, and the formed system may be applied to various aspects such as design and management of urban sand tables.

DETAILED DESCRIPTION OF THE INVENTION

Technical schemes of the present invention are further described in detail below with reference to drawings and embodiments.

The present invention discloses a system for constructing an urban design digital sand table. The system includes the following module: a sand table environment constructing module, configured to construct a digital environment of the urban design sand table, that is, perform digital conversion and spatial superposition of the urban built environment, multi-source big data and an urban design scheme. According to actual demands of urban design, the digital sand table is divided into 5 functional modules, including 3 technical modules: an element grading display module, a spatial indicator interpretation module and a spatial calculation tool module; and 2 management modules: an offline data extraction module and a dynamic real-time editing module. The element grading display module is configured to perform hierarchical management on urban design elements and perform visual hierarchical display. The spatial indicator interpretation module is configured to articulate names, algorithms, and attributes for indicators in an indicator library of the urban design digital sand table. The spatial calculation tool module is configured to load a toolkit to calculate a selected range in the digital sand table. The offline data extraction module is configured to extract the data of the digital sand table so as to export two-dimensional and three-dimensional spatial data in an offline mode. The dynamic real-time editing module is configured to perform real-time editing operation on an urban digital design scheme loaded in the system.

The technical schemes of the present invention will be described in detail below in conjunction with a case of the starting area of Nansha New District and the drawings.

Figure 1:
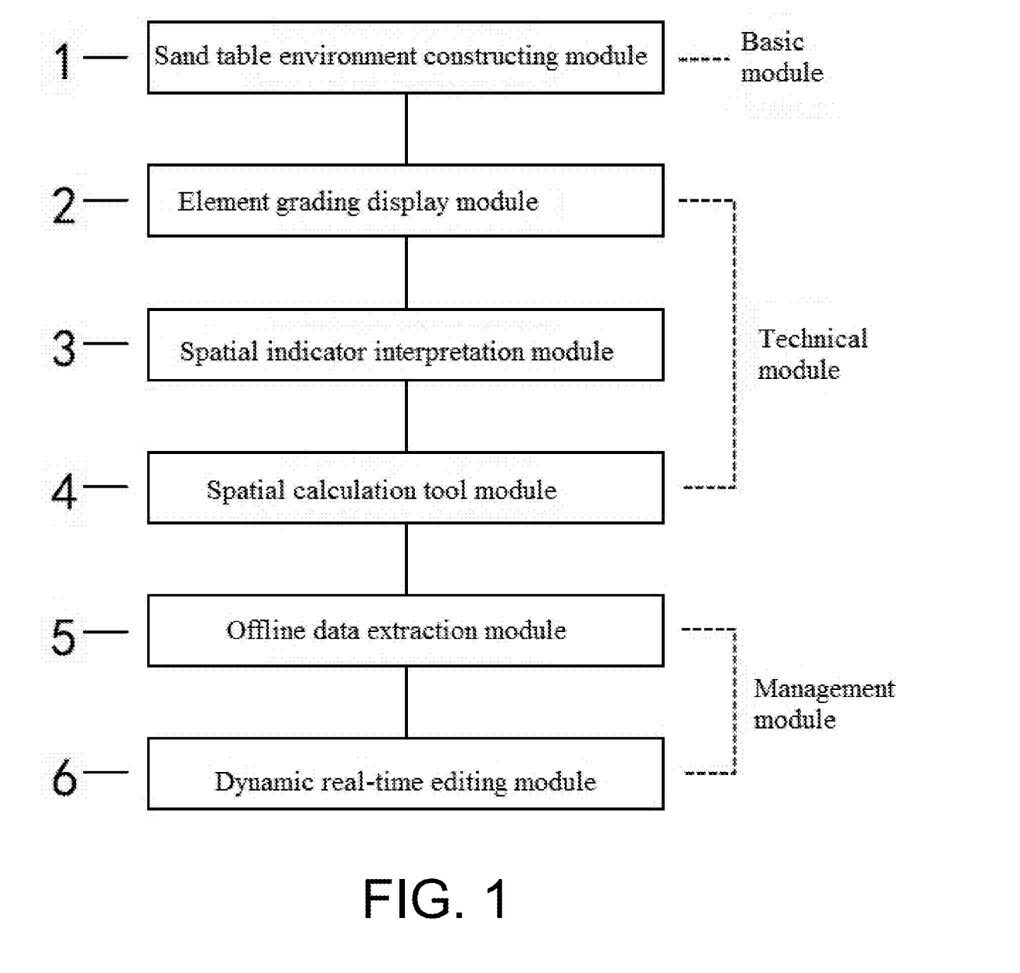
FIG. 1 is a schematic diagram of modules of a system for constructing an urban design digital sand table of the present invention.

The module composition of the system is shown in FIG. 1. The modules are described in detail as follows.

Figure 2:
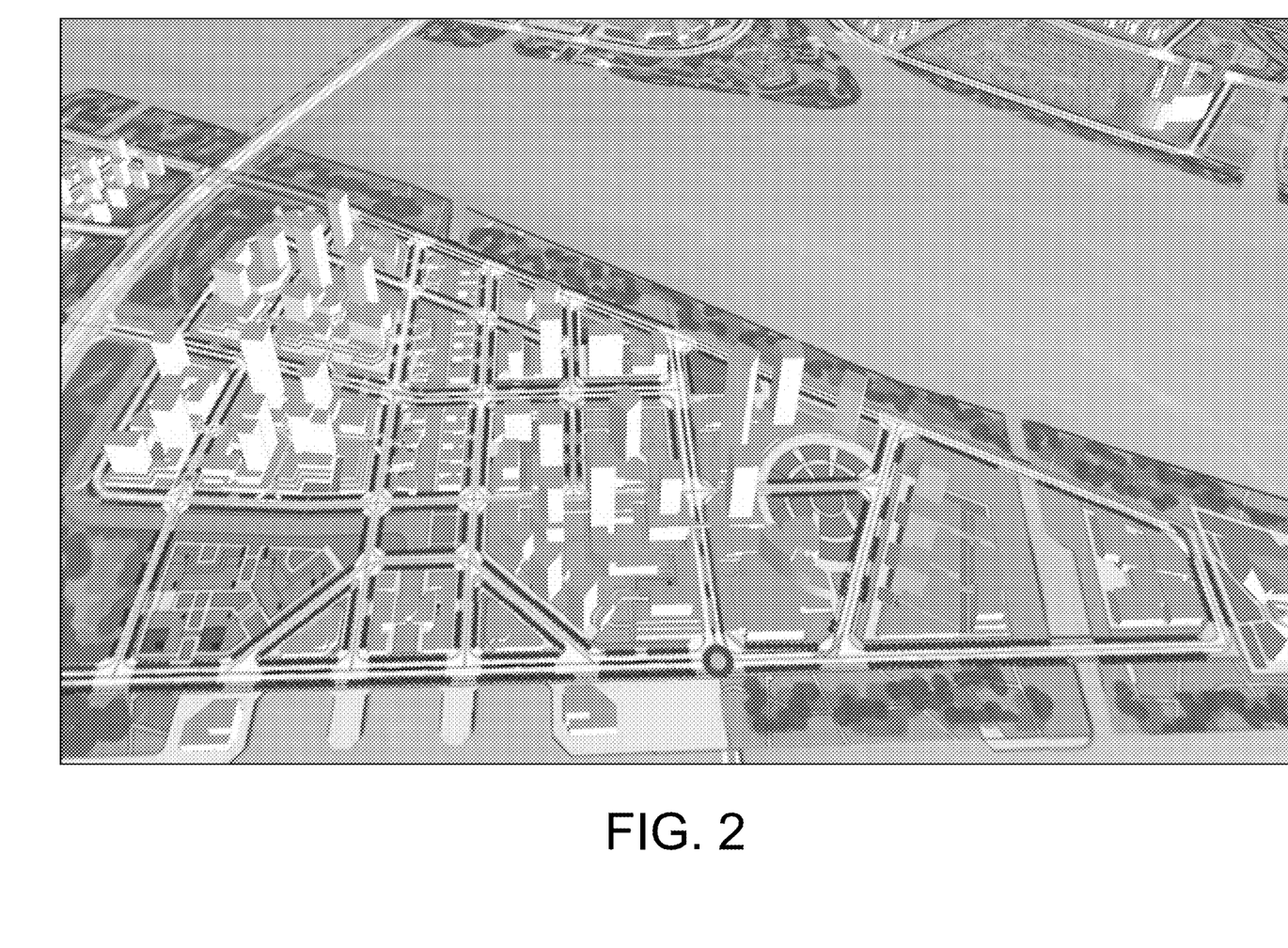
FIG. 2 is a schematic diagram of a constructing interface of a digital environment of an urban design sand table of the present invention, that is, a schematic diagram of a sand table environment constructing module.

(1) The sand table environment constructing module is configured to construct a digital environment of the urban design sand table. As shown in FIG. 2, it is a schematic diagram of a construction interface of the digital environment of the urban design sand table of the present invention. When the digital environment of the urban sand table is constructed, a front end of the system adopts a C/S platform architecture sand table and module system, and a deployment form is an EXE executable file; a MongoDB database is deployed in a background to share and release natural and built environment data such as oblique photography, and a GIS data server and the like are deployed in the background; and the front end loads the background data through a database port and GIS data service URL.

(1.1) Digital conversion of the urban built environment: based on an oblique photography, three-dimensional slice cache model data in an urban range is acquired. Corresponding configuration in an SCP format is recorded through an RCD30 platform, and the corresponding configuration is stored in an UltraLAB GX480P/GX610P Turing computation workstation. Further, a DSM (Digital Surface Model) is generated by SuperMap software. Then, based on vector surface data corresponding to oblique photography data, an effective range of model TIN (Triangulation Irregular Net) is judged, and a model surface is fit from top to bottom to generate a monomer model that may participate in the calculation.

(1.2) Digital superposition of multi-source big data: a coordinate system of the multi-source big data including business POI, mobile phone signaling, and LBS positioning is converted by the SuperMap software, and unified into an urban coordinate system, usually the Yellow Sea coordinate system, and the multi-source big data are stored in an SHP format.

(1.3) Digital conversion of an urban design scheme: results of urban designs include three-dimensional models of the design scheme, but a file format cannot be directly loaded into the digital sand table. An acquired urban design three-dimensional model file in an SKP format needs to be converted into a MAX format file by Autodesk FBX software, revised in 3DS Max software, and further converted into a data source in a UDB format supported by the system.

(1.4) Extraction of control elements of the urban design scheme: urban design is to achieve design intent through the control of an urban spatial form. From the perspective of the spatial form, the most basic control elements are points, lines and planes. Therefore, the control elements of the urban design scheme are extracted by points, lines and planes. A control element vector set is constructed by establishing the corresponding map layer storage in AutoCAD software, and converted into an SHP format file by ArcGIS software.

(1.5) Storage, sharing and release of multidimensional data: according to an urban built environment model and a source SCP file of the multi-source big data, the associated SCP data are saved to a MongoDB database, and a new SCP configuration file is generated. Three-dimensional model data and control element data of the urban design scheme are stored in a database type data source, wherein the database type data source includes various databases of Oracle Plus, Oracle Spatial, SQL Server Plus, PostgreSQL, DB2, and the like, and geometric information and attribute information are stored in the database.

Figure 3:
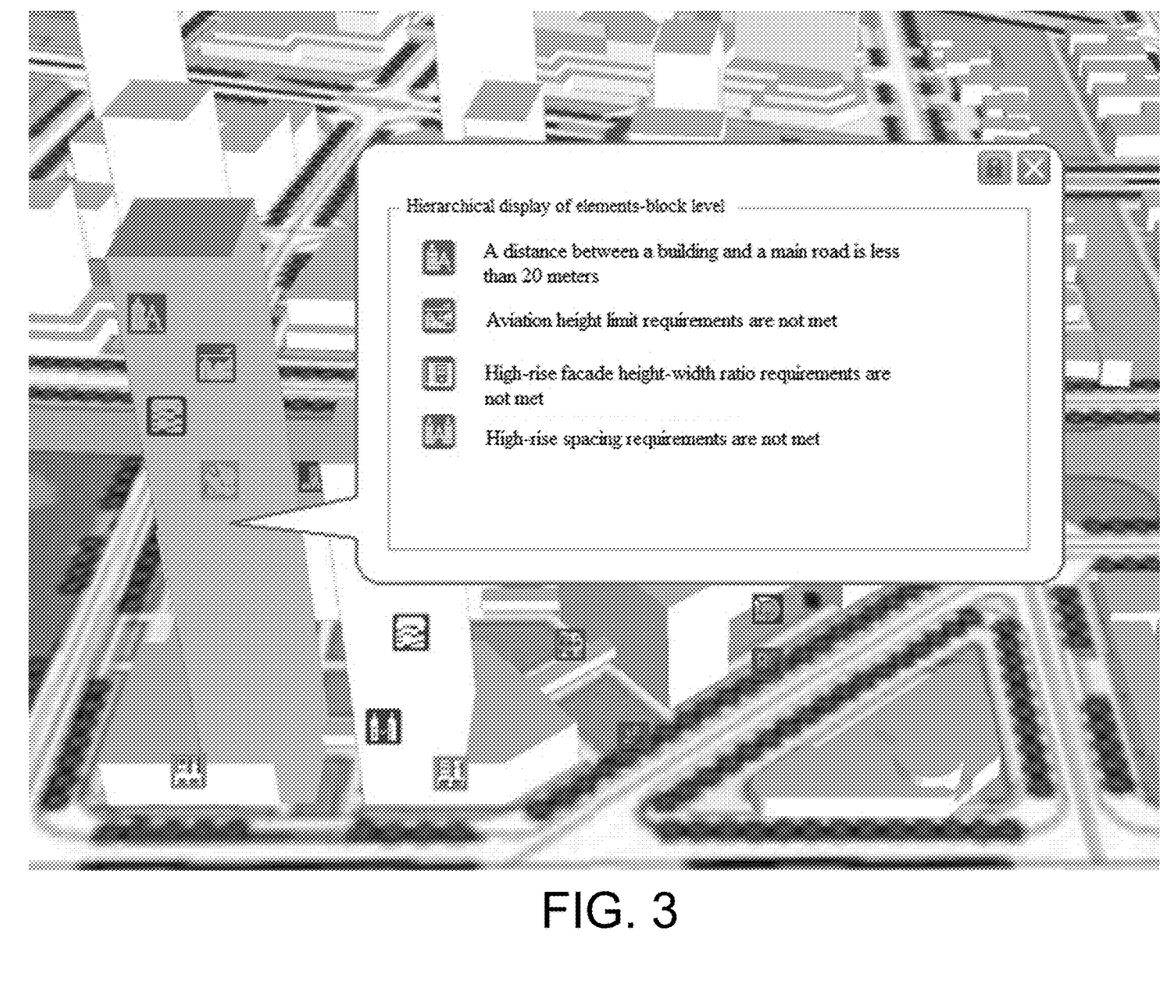
FIG. 3 is a schematic diagram of an element grading display module.

(2) The element grading display module has functions as follows.

(2.1) Hierarchical management of urban design element data: the urban design element data are managed in a hierarchical storing mode. The system manages the graded elements in an interface form of layer trees. Display or hiding of the hierarchical elements is dynamically managed based on user demand interaction.

(2.2) Construction of a visual precision grading system: according to different display demands, the visual precision grading system is constructed, and element content of corresponding precision is displayed under different scales. A specific grading method is shown in the table below.

TABLE 1

| Level | Scale | Display content |
|---|---|---|
| L10 | 1:577,791.71 | Overall level: boundary, axis |
| L11 | 1:288,895.85 | Overall level: boundary, axis, corridor, plane partition, three-dimensional partition |
| L12 | 1:144,447.93 | Overall level: boundary, axis, corridor, plane |

TABLE 1-continued

| Level | Scale | Display content |
|---|---|---|
| | | partition, three-dimensional partition, landscape point, viewpoint |
| L13 | 1:72,223.96 | Overall level: boundary, axis, corridor, plane partition, three-dimensional partition, landscape point, viewpoint, characteristic intention area, road |
| L14 | 1:36,111.98 | Area level: axis, plane partition, three-dimensional partition, characteristic intention area, road |
| L15 | 1:18,055.99 | Area level: axis, plane partition, three-dimensional partition, characteristic intention area, road, block division and spatial form |
| L16 | 1:9,028.00 | Area level: axis, plane division, three-dimensional division, characteristic intention area, road, block division and spatial form, architecture and landmark |
| L17 | 1:4,514.00 | Area level: axis, plane division, three-dimensional division, characteristic intention area, road, block division and spatial form, architecture and landmark, open space |
| L18 | 1:2,257.00 | Section level: road, block division and spatial form, architecture and landmark, open space, integrated transportation facility |
| L19 | 1:1,128.50 | Section level: road, block division and spatial form, architecture and landmark, open space, integrated transportation facility, underground space |
| L20 | 1:564.25 | Section level: road, block division and spatial form, architecture and landmark, open space, integrated transportation facility, underground space, urban sustainable development system |

(2.3) Hierarchical display of the urban design elements: by an LOD (Levels of Details) technology, according to the visual precision grading system, hierarchical display is performed on the levels of details displayed by the elements. The near elements are displayed by fine model effects, and the distant elements are displayed by a simple model to improve rendering performance of the elements.

Figure 4:
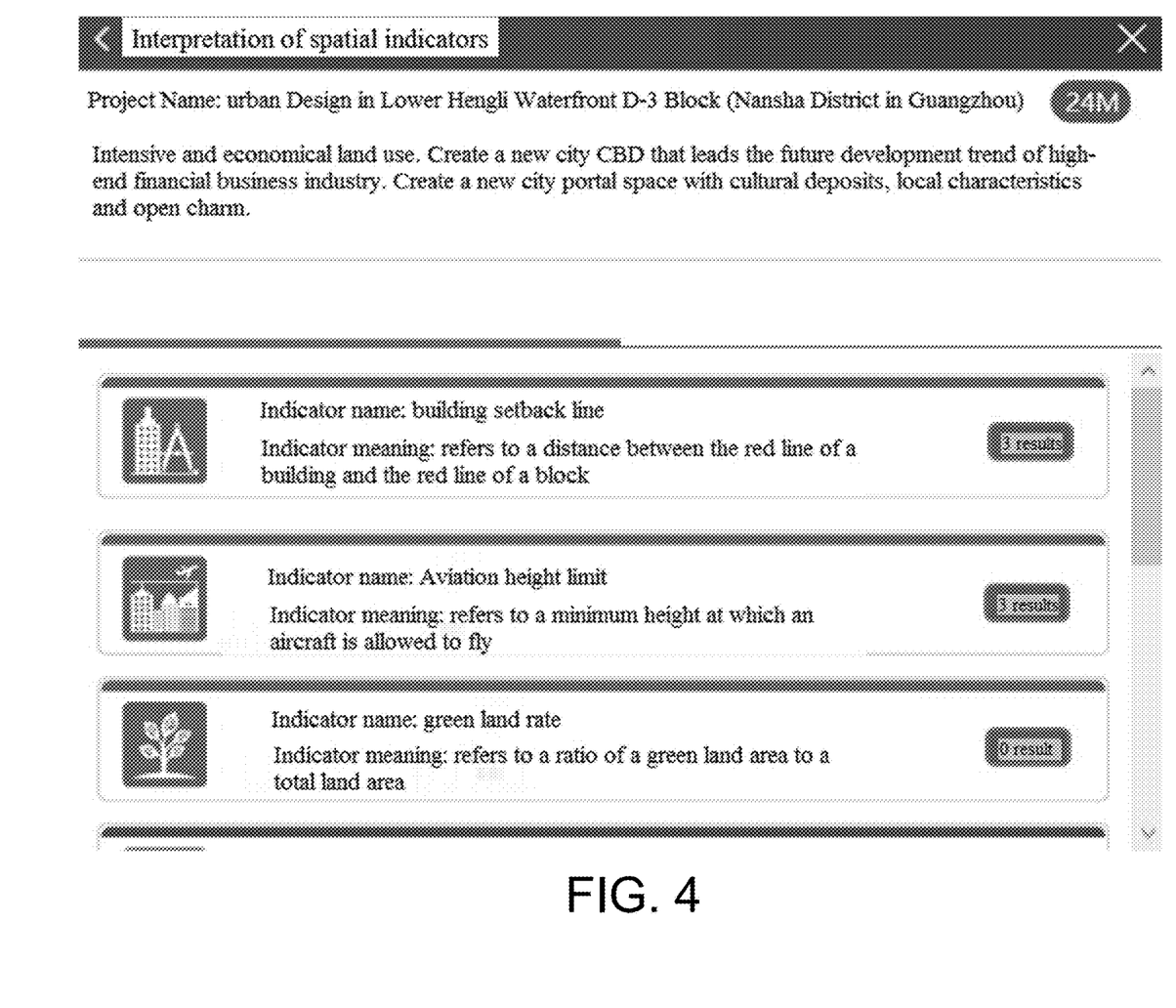
FIG. 4 is a schematic diagram of a spatial indicator interpretation module.

(3) The spatial indicator interpretation module has functions as follows.

(3.1) Summarization of an indicator library of the urban design digital sand table: professional indicator terms in all urban designs, for example, building density, building base area, plot ratio, maximum building area, maximum building height, and average building height, are summarized to form the indicator library of the urban design digital sand table.

(3.2) Compilation of an indicator meaning table: the indicator meaning table refers to an index file of the indicator library on the basis of the indicator library of the urban design digital sand table. An indicator code is recorded, which is a unique value of the indicator, and is configured to read the specified indicator, an indicator name and an indicator algorithm from the indicator library. The indicator code includes an indicator function name, an index indicator calculation implementation function, and indicator description configured to describe an indicator meaning and calculation parameters. According to actual needs, the indicator meaning table may further include other attributes besides the above attributes. Part of the indicator meaning table is shown in Table 2 below.

TABLE 2

| Indicator code | Indicator name | Indicator description | Indicator algorithm |
|---|---|---|---|
| JZMD | Building density | A ratio (%) of a total base area of a building to an occupied area in a range of land use | =sum (building base area)/land area |
| ZDJDMJ | Maximum base area | A land area occupied by a bottom of the building | =max (building base area) |
| RJL | Plot ratio | A ratio of a total above-ground building area to a total land area in the range of land use, configured to measure intensity of land use | =sum (building base area*building storeys)/land area |
| ZDJZMJ | Maximum building area | The total building area in the range of land use | =max (building base area*building storeys) |
| ZDJZGD | Maximum building height | Height of the highest building in the range of land use | =max (building height) |
| PJJZGD | Average building height | Average height of all buildings in the range of land use | =ave (building height) |

(3.3) Articulation of indicator interpretation: the indicator meaning table is entered into the system, so that each indicator noun is articulated with a plurality of attribute links including indicator interpretation and calculation formulas. The links manage the urban design element data in a hierarchical storing mode. The system manages the articulated attributes in an interface form of layer trees, and display is managed based on user demand interaction.

(4) The spatial calculation tool module has functions as follows.

(4.1) Selection of a range that needs spatial calculation: with a sand table system analysis tool, a plurality of elements is selected to form a set or a certain spatial range by clicking or framing the elements.

(4.2) Calculation of basic spatial indicators: based on the selected spatial range, according to the indicator interpretation module, element model information data in the spatial range is automatically acquired and substituted into algorithm functions, and the basic spatial indicators are calculated. The calculation functions are as follows: JZMD=sum (building base area)/land area, ZDJDMJ=max (building base area), RJL=sum (building base area*building storeys)/land area, ZDJZMJ=max (building base area*building storeys), ZDJZGD=max (building height), PJJZGD=ave (building height).

(4.3) Division of spatial calculation toolkits: according to urban design spatial calculation demands, the spatial calculation tool module is divided into three spatial calculation toolkits: a spatial basic calculation toolkit, a single-dimensional data calculation toolkit, and a multi-source data coupling calculation toolkit.

The spatial basic calculation toolkit performs geometrical analysis of a spatial form of the selected range, and may be implemented by loading tool modules such as distance analysis, region analysis and neighborhood analysis under SuperMap.

Distance analysis estimates similarity measure between different samples.

Region analysis acquires and analyzes information such as spatial locations, distribution, forms, formation, and evolution about geographic objects from spatial data.

Neighborhood analysis visually represents a conceptual class in a neighborhood or an object in the real world.

The single-dimensional data calculation toolkit performs distribution structural analysis of a single-dimensional data type for the selected range, and may be implemented by loading tool modules such as interpolation analysis and density analysis under the SuperMap.

Interpolation analysis predicts pixel values in a grid and kriging interpolation based on finite sample data points.

Density analysis performs interpolation calculation by discrete point data or line data, and is mainly divided into nuclear density analysis and ordinary point or line density analysis according to different interpolation principles.

The multi-source data coupling calculation toolkit performs superposition coupling degree analysis of any two types of data in multi-source data for the selected range, and may be implemented by loading tool modules such as multi-analysis and superposition analysis under the SuperMap.

Multi-analysis is an analysis method for studying a correlation between a plurality of independent variables and dependent variables.

Superposition analysis is an analysis method for generating new data through a series of set operations on any two types of data in the multi-source data under a unified spatial reference system.

Figure 5:
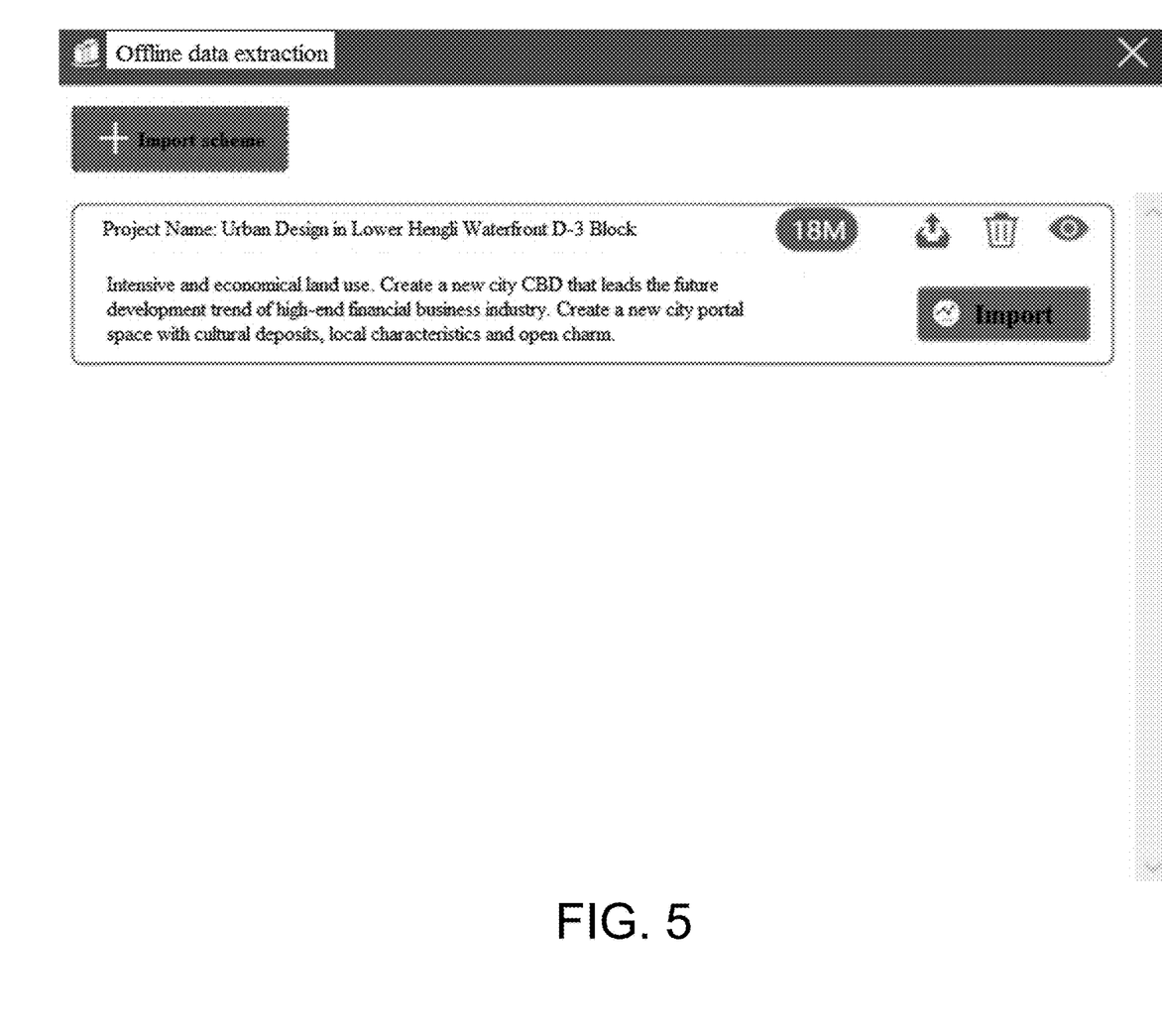
FIG. 5 is a schematic diagram of an offline data extraction module.

(5) The offline data extraction module has functions as follows.

(5.1) Selection of a data extraction spatial range: in an offline data extraction interface of the sand table system, the spatial range requiring offline data extraction is delineated on a system map by drawing, and the coordinate system is kept unchanged.

(5.2) Packing and exporting of data: based on polygon clipping, two-dimensional and three-dimensional data in the selected range are packed and exported. The packed and exported data may run the basic functions of other modules under offline conditions.

Delineating the spatial range on the system map by drawing refers to that a plurality of coordinate points are formed by clicking on the system map by a mouse sequentially, and the plurality of coordinate points are sequentially connected to form a closed area, that is, the spatial range of offline data extraction.

(6) The dynamic real-time editing module has functions as follows.

Dynamical editing of a design scheme: by mouse dragging interactive operations or interface modification of parameters, based on memory simulation, a dimension of a model is stretched or scaled in real time. The model is dynamically reconstructed. Based on a texture mapping technology, model rendering colors or texture maps are adjusted in real time. The edited scheme may be saved and exported.

What is claimed is:

1. A system for constructing an urban design digital sand table, comprising a processor, wherein the processor is configured to:
construct a digital environment of the urban design digital sand table;
perform hierarchical management on urban design elements, and perform hierarchical display by constructing a visual precision grading system;
articulate names, algorithms, and attributes for indicators in an indicator library of the urban design digital sand table;
load a toolkit to calculate a selected spatial range in the urban design digital sand table;
export two-dimensional and three-dimensional data in the selected spatial range in an offline mode; and perform real-time editing operation on an urban digital design scheme loaded in the system,
wherein the processor is further configured to implement construction of the digital environment of the urban design digital sand table by performing the following steps:
acquiring three-dimensional slice cache model data in an urban range, and digitizing the model data to generate a CAD model that can participate in calculation;
converting and unifying a coordinate system of multi-source big data into an urban coordinate system, and storing the multi-source big data in an SHP format to realize digital superposition of the multi-source big data;
formatting and revising an urban three-dimensional model design file into a data source in a UDB format supported by the system to realize digital conversion of an urban design scheme;
extracting control elements of the urban design scheme by points, lines and planes to realize extraction of the control elements of the urban design scheme; and
storing, sharing and releasing multi-dimensional data for an environmental model constructed of the urban design digital sand table and a multi-source big data file.

2. The system for constructing the urban design digital sand table of claim 1, wherein the processor has the following functions:
hierarchically storing the urban design elements, performing hierarchical display on the urban design elements in a form of layer trees, and dynamically managing display or hiding of the urban design elements based on demand interaction;
according to different display demands, constructing a visual precision grading system, and displaying element content of corresponding precision under different scales; and
according to the visual precision grading system, performing hierarchical display on levels of details displayed by the urban design elements.

3. The system for constructing the urban design digital sand table of claim 1, wherein the processor has the following functions:
summarizing professional indicator terms in all urban designs to form the indicator library of the urban design digital sand table;
compiling an indicator meaning table as an index file of the indicator library on the basis of the indicator library of the urban design digital sand table; and
entering the indicator meaning table into the system, so that each indicator noun is articulated with a plurality of attribute links including indicator interpretation and calculation formulas.

4. The system for constructing the urban design digital sand table of claim 1, wherein the processor has the following functions:
selecting a plurality of elements to form a set or a certain spatial range by clicking or framing the elements;
based on the selected element set or spatial range, according to the articulated names, algorithms, and attributes for the indicators in the indicator library of the urban design digital sand table, automatically acquiring element model information data in the spatial range, and calculating basic spatial indicators; and
according to urban design spatial calculation demands, dividing the toolkit into three spatial calculation toolkits: a spatial basic calculation toolkit, a single-dimensional data calculation toolkit, and a multi-source data coupling calculation toolkit, and by the above toolkits, respectively performing geometrical analysis of a spatial form, distribution structural analysis of a single-dimensional data type, and superposition coupling degree analysis of any two types of data in multi-source data, on the selected set or range.

5. The system for constructing the urban design digital sand table of claim 1, wherein the processor has the following functions:
   delineating a spatial range requiring offline data extraction on a system map by drawing; and
   based on polygon clipping, packing and exporting the two-dimensional and three-dimensional data in the selected spatial range.

6. The system for constructing the urban design digital sand table of claim 1, wherein the processor has the following functions:
   for the urban design scheme loaded in the system, by mouse dragging interactive operations or interface modification of parameters, based on memory simulation, stretching or scaling a dimension of a model in real time, dynamically reconstructing the model, and based on a texture mapping technology, adjusting model rendering colors or texture maps in real time.

7. A system for constructing an urban design digital sand table, comprising a processor, wherein the processor is configured to:
   construct a digital environment of the urban design digital sand table;
   perform hierarchical management on urban design elements, and perform hierarchical display by constructing a visual precision grading system;
   articulate names, algorithms, and attributes for indicators in an indicator library of the urban design digital sand table;
   load a toolkit to calculate a selected spatial range in the urban design digital sand table;
   export two-dimensional and three-dimensional data in the selected spatial range in an offline mode; and
   perform real-time editing operation on an urban digital design scheme loaded in the system,
   wherein the processor is further configured to:
   select a plurality of elements to form a set or a certain spatial range by clicking or framing the elements;
   based on the selected element set or spatial range, according to the articulated names, algorithms, and attributes for the indicators in the indicator library of the urban design digital sand table, automatically acquire element model information data in the spatial range, and calculate basic spatial indicators; and
   according to urban design spatial calculation demands, divide the toolkit into three spatial calculation toolkits: a spatial basic calculation toolkit, a single-dimensional data calculation toolkit, and a multi-source data coupling calculation toolkit, and by the above toolkits, respectively perform geometrical analysis of a spatial form, distribution structural analysis of a single-dimensional data type, and superposition coupling degree analysis of any two types of data in multi-source data, on the selected set or range.

* * * * *